United States Patent
Elias et al.

(10) Patent No.: US 9,517,699 B2
(45) Date of Patent: Dec. 13, 2016

(54) MOTOR VEHICLE HAVING A STORAGE FOR ELECTRIC ENERGY

(75) Inventors: Björn Elias, Hepberg (DE); Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 441 days.

(21) Appl. No.: 14/124,481

(22) PCT Filed: Feb. 1, 2012

(86) PCT No.: PCT/EP2012/000423
§ 371 (c)(1),
(2), (4) Date: Dec. 6, 2013

(87) PCT Pub. No.: WO2012/167851
PCT Pub. Date: Dec. 13, 2012

(65) Prior Publication Data
US 2014/0097794 A1    Apr. 10, 2014

(30) Foreign Application Priority Data
Jun. 7, 2011  (DE) .......... 10 2011 103 439

(51) Int. Cl.
*B60L 11/18* (2006.01)
*H02J 7/00* (2006.01)
(Continued)

(52) U.S. Cl.
CPC ............ *B60L 11/182* (2013.01); *B60L 3/0069* (2013.01); *B60L 3/04* (2013.01); *B60L 11/1831* (2013.01);
(Continued)

(58) Field of Classification Search
CPC ..... B60L 11/182; B60L 11/18; B60L 11/1827; B60L 11/1831; B60L 11/1833; H02J 7/00; H02J 7/0078; H02J 7/007; Y02T 90/125; B60K 1/04
(Continued)

(56) References Cited

U.S. PATENT DOCUMENTS 5,179,256 A    1/1993   Haglund
5,838,853 A *  11/1998  Jinnai ................. G02B 6/2808
                                          385/14
(Continued)

FOREIGN PATENT DOCUMENTS

CN    101902062 A    12/2010
CN    102035265 A    4/2011
(Continued)

OTHER PUBLICATIONS

International Search Report issued by the European Patent Office in International Application PCT/EP2012/000423 on Nov. 23, 2012.
(Continued)

*Primary Examiner* — Richard Isla Rodas
*Assistant Examiner* — Dung V Bui
(74) *Attorney, Agent, or Firm* — Henry M. Feiereisen LLC

(57) ABSTRACT

The invention relates to a motor vehicle having a storage for electrical energy, which store is coupled to a coil into which electrical energy can be induced from outside the motor vehicle during a charging process. The vehicle includes a housing in which the coil is arranged, the housing being made of plastic toward the underside of the motor vehicle, and an optical waveguide is arranged in particular between two walls of the housing. When light from a light source is coupled into the optical waveguide and a detector detects the light, damage to the housing can be detected and the
(Continued)

induction of electrical energy into the coil at a charging station can optionally be interrupted in order to avoid hazards to persons.

7 Claims, 2 Drawing Sheets

(51) Int. Cl.
    *B60L 3/00*     (2006.01)
    *B60L 3/04*     (2006.01)

(52) U.S. Cl.
    CPC ............ *B60L 11/1833* (2013.01); *H02J 7/007* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
    USPC .......................................................... 320/108
    See application file for complete search history.

(56) References Cited

U.S. PATENT DOCUMENTS

| | | | |
|---|---|---|---|
| 7,825,543 B2* | 11/2010 | Karalis | B60L 11/182 307/104 |
| 8,217,774 B2 | 7/2012 | Elias et al. | |
| 2003/0194186 A1* | 10/2003 | Taylor | G02B 6/255 385/52 |
| 2010/0277121 A1* | 11/2010 | Hall | B60L 11/182 320/108 |
| 2010/0300209 A1 | 12/2010 | Kreuzer et al. | |
| 2011/0074346 A1 | 3/2011 | Hall et al. | |
| 2011/0248844 A1 | 10/2011 | Elias et al. | |
| 2012/0256586 A1* | 10/2012 | Becker | B60L 11/182 320/108 |
| 2014/0097794 A1* | 4/2014 | Elias | B60L 3/0069 320/108 |

FOREIGN PATENT DOCUMENTS

| | | |
|---|---|---|
| DE | 31 11 858 | 10/1982 |
| DE | 33 43 510 | 6/1985 |
| DE | 37 16 168 | 11/1988 |
| DE | 44 45 999 | 6/1995 |
| DE | 44 07 763 | 9/1995 |
| DE | 100 31 406 | 1/2002 |
| DE | 102007008464 | 8/2008 |
| DE | 102007008507 | 8/2008 |
| JP | 2002-084664 | 3/2002 |
| JP | 2003-299254 | 10/2003 |
| WO | WO 97/42695 | 11/1997 |

OTHER PUBLICATIONS

Chinese Search Report issued on Apr. 20, 2015 with respect to counterpart Chinese patent application 201280027880.0.
Translation of Chinese Search Report issued on Apr. 20, 2015 with respect to counterpart Chinese patent application 201280027880.0.

* cited by examiner

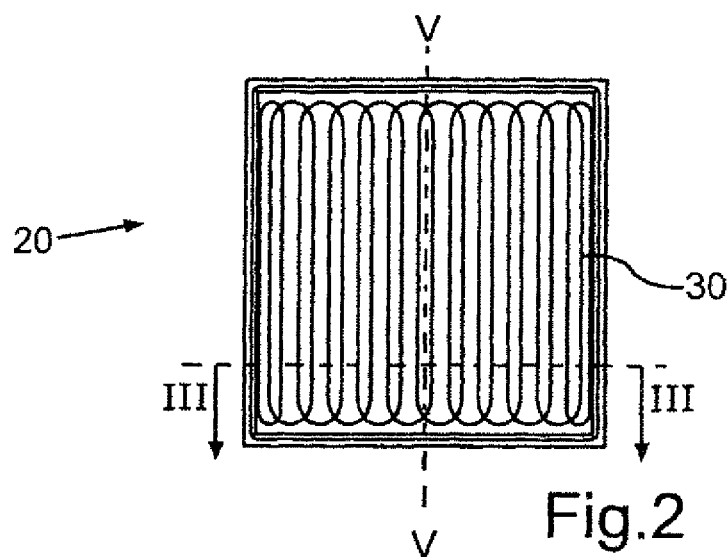
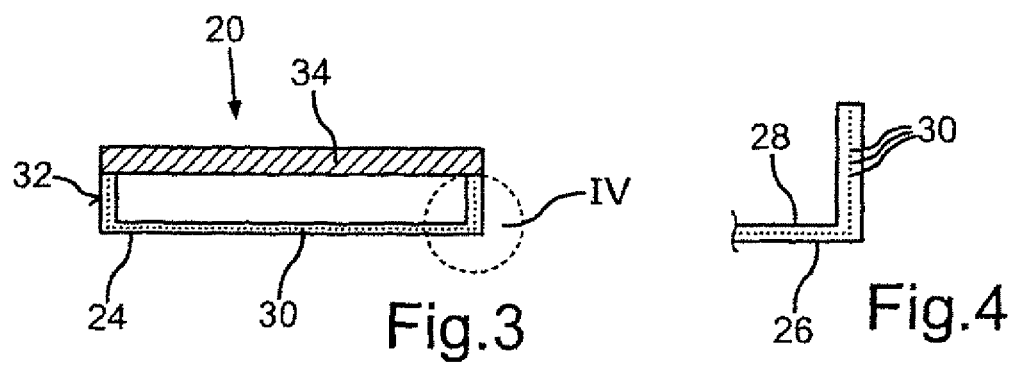
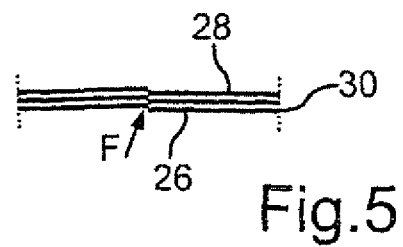

MOTOR VEHICLE HAVING A STORAGE FOR ELECTRIC ENERGY

CROSS-REFERENCES TO RELATED APPLICATIONS

This application is the U.S. National Stage of International Application No. PCT/EP2012/000423, filed Feb. 1, 2012, which designated the United States and has been published as International Publication No. WO 2012/167851 and which claims the priority of German Patent Application Serial No. 10 2011 103 439.4, filed Jun. 7, 2011, pursuant to 35 U.S.C. 119(a)-(d).

BACKGROUND OF THE INVENTION

The invention relates to a motor vehicle with a storage for electric energy for example for providing electric energy for an electric motor in an electric vehicle or hybrid vehicle.

Inquiries pursued by experts in the field of electric vehicles involve how to charge a storage for electric energy. Besides the conventional approach of supplying electric energy via a charging cable, it is considered to supply electric energy inductively, i.e., in particular via a magnetic field. Inductively coupling electric energy into a motor vehicle from outside would have the advantage that because no charging cable is required, safety measures associated with the charging cable, in particular a complex control of how to initiate and complete the charging process, are not needed to prevent a person coming into contact with the high voltage.

It was previously contemplated for a motor vehicle into which electric energy is to be induced to have a receiver coil on its underside and to embed a transmitter coil in the ground so that the motor vehicle can simply drive up to a corresponding site on the ground so that the energy can be transferred from the transmitter coil into the receiver coil.

The problem appeared to be that the underside of the motor vehicle is particularly sensitive against damage. Thick metal walls for protecting the coils are inadequate because such metal walls shield the magnetic field via which the electric energy is to be coupled in. On the other hand nonmetallic material used on the underside of the motor vehicle can be easily damaged and may result in a hazard for persons, especially for example during the charging process.

The subject matter of DE 4445 999A1 and DE 100 31 406A1 is the recognition of accidents (crashes) of a motor vehicle. It is proposed to arrange optical waveguides in an expected deformation region of the motor vehicle at a vehicle body part. A light source emits its light into an end of the optical waveguide and at another end of the optical waveguide an optic-electric converter receives the exiting light and outputs an electric measuring value which is a measure of the intensity of the received light. When a crash occurs in a region of the corresponding vehicle body part, the optic-electric converter no longer receives the light emitted by the light source so that the crash is recognized. In this case for example an airbag is triggered or another safety measure is taken.

SUMMARY OF THE INVENTION

It is an object of the invention to provide a motor vehicle with a storage for electric energy which can be particularly easily charged from outside without sacrificing safety of the motor vehicle.

The object is solved by a motor vehicle including a storage for electric energy; a housing including a plastic material towards an underside of the motor vehicle; a coil received in the housing and coupled with the storage for electric energy, said coil being constructed for introducing energy into the coil during a charging process from outside the motor vehicle; at least one optical waveguide arranged in or on the plastic material into which light from the light source can be coupled; a detector for receiving the light emitted by the light source; and a control device configured to carry out the charging process and to prevent the charging process when the detector does not receive light in an expected manner.

In the motor vehicle according to the invention with a storage for electric energy, the storage of electric energy is coupled with a coil into which electric energy is inducible from outside of the motor vehicle in the charging process. The coil is arranged in a housing, which includes a plastic material towards the underside of the motor vehicle. In or on the plastic material at least one optical waveguide is arranged into which during operation light is coupled by a light source, which light is then received by a detector. The motor vehicle also has a control device, which is configured to effect a charging process of the vehicle, for example by actuating corresponding switches when the storage is to be charged. The storage device is further configured to block the charging process when the detector does not receive light in an expected manner, i.e., either does not receive light at all or to a lower degree than expected or than would be normal during error-free operation.

The invention is based on the recognition that the teaching of the state-of-the-art to use optical waveguides for detecting damage to a deformable component during a crash of the motor vehicle, can also be applied to other components which do not require triggering of an airbag when damaged but for which it is desirable to detect whether they are damaged. This idea in conjunction with a housing for a coil into which electric energy can inductively be coupled, provides an approach how to wirelessly charge the storage for electric energy without sacrificing safety; because damage to the housing at least on its bottom side would be detected and the charging process would then be blocked. Dangerous situations may occur in particular during a charging process.

In a preferred embodiment, the at least one optical waveguide is arranged between two plastic walls of the housing. This thus resembles a type of sandwich construction. This construction is advantageous because in every case in which both plastic walls are damaged the optical waveguide is also damaged. And only damage to both plastic walls poses a danger.

The at least one optical waveguide is preferably configured as optical fiber, particularly preferably as glass fiber. It can thus be provided cost-effectively.

In a preferred embodiment, the at least one optical waveguide forms a (fine mashed) grid across the (essentially entire) bottom side of the housing. When using such a grid, in particular when it is sufficiently fine mashed, it ensures to a higher degree that in case of damage to the housing bottom this damage is actually detected.

In a preferred embodiment of the invention, the housing is formed from plastic material only at its bottom side and on the sidewalls, however, towards the topside of the motor vehicle it is closed by a cover which includes metal and/or electronic components involved in carrying out the charging process. When the cover is made of metal, electric energy is prevented from being coupled into other components of the motor vehicle beyond the coil.

The metal cover shields the magnetic field. For saving space, the cover is at the same time usable as carrier for electronic components, in particular those that are used during carrying out the charging process.

BRIEF DESCRIPTION OF THE DRAWING

In the following, a preferred embodiment of the invention is described in more detail with reference to the drawing, in which FIG. 3 illustrates a section through the housing of FIG. 2 according to the line without a coil shown in FIG. 1, FIG. 4 is an enlargement of the section according to FIG. 3 corresponding to the reference numeral IV and FIG. 5 is a section through a housing bottom corresponding to the line V-V of FIG. 2 how it may look only in the case of its damage to the housing bottom.

DETAILED DESCRIPTION OF PREFERRED EMBODIMENTS

Figure 1:
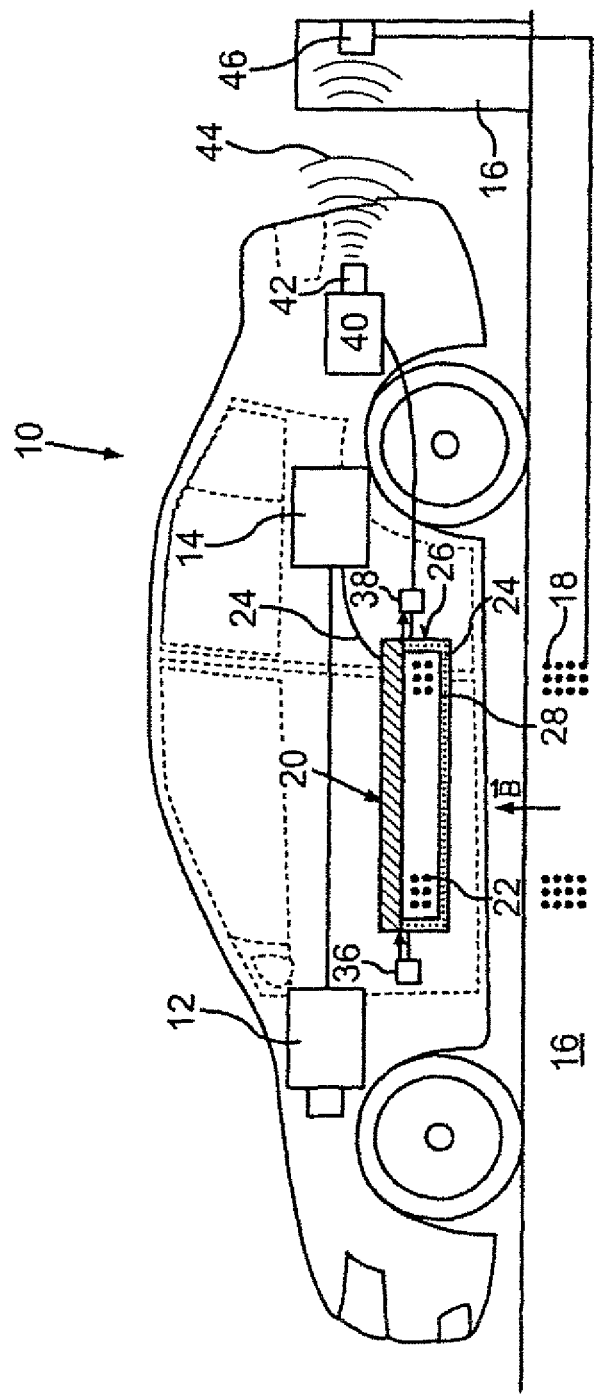
FIG. 1 illustrates a motor vehicle according to the invention, FIG. 2 a top view onto a housing, which in the present case is opened and shown translucent, illustrates how it is used in the motor vehicle according to the invention.

A motor vehicle, overall designated with 10, includes an electric motor 12, which is supplied with electric current from an electric battery 14. In the present case, the electric battery is to be electrically charged at the charging station 16. In the present case, this occurs inductively. For this purpose the charging station includes a transmitter coil 18, which is installed in the ground. The motor vehicle 10 includes a housing, overall designated with 20, in which a receiver coil 22 is integrated which is coupled with the battery 14 via a connecting line 24.

The receiver coil 22 is arranged in a housing 20. The receiver coil 22 includes a bottom part 24, which is formed by two plastic walls 26, 28 (FIG. 4), between which an optical waveguide 30 is installed. As can be seen from FIG. 2, the optical waveguide 30 is wound so that the bending radius does not become too small and damage the optical waveguide. The wound optical waveguide 30 forms a fine meshed grid, which quasi covers the entire bottom region of the housing 20 and further extends into the sidewall 32.

The cover 34 of the housing 20 on the other hand is made of metal in order to shield the interior of the motor vehicle 10 from the magnetic field B which is generated by the transmitter coil 18. The cover 34 is also a carrier for electronic components that are used for the charging process.

Light from the light source 36 is coupled into the optical waveguide 30, and at the other end of the optical waveguide 30 the light is coupled into an opto-electric sensor element 38. This receiver thus detects whether the optical waveguide 30 is undamaged. The signals from the opto-electric sensor element 38 are supplied to a control device 40 which can transmit signals 44 to a receiver 46 in the charging station 16 via a radio transmitter 42.

So long as the sensor element 38 receives the light from the light source 36 this indicates that the bottom 20 of the housing with the walls 26 and 28 is undamaged.

In case of damage as it can occur according to FIG. 5 due to the influence of a force (force F) when the motor vehicle 10 is driving, the optical waveguide 30 is interrupted and the opto-electric sensor element 38 no longer receives light intensity.

The control device 40 thus detects via the signals from the opto-electric sensor element 38 whether the optical waveguide 30 is undamaged or not. When the optical waveguide 30 is undamaged the charging station 16 is informed via the radio signal 44 that the motor vehicle 10 is ready to be charged (optionally in the presence of further conditions). When on the other hand the optical waveguide 30 and with this the housing 20 is damaged, current-conducting parts may protrude out of the motor vehicle 10 during inducing electric current in the coil 22. In this case the control device 40 interrupts the charging by the charging station i.e., the generation of a magnetic field B by the transmitter coil 18.

What is claimed is:

1. A motor vehicle, comprising:
    a storage for electric energy;
    a housing including a plastic material towards an underside of the motor vehicle;
    a coil received in the housing and coupled with the storage for electric energy, said coil being constructed for introducing energy into the coil during a charging process from outside the motor vehicle;
    at least one optical waveguide arranged in or on the plastic material into which light from a light source can be coupled;
    a detector for receiving the light emitted by the light source; and
    a control device configured to carry out the charging process and to prevent the charging process when the detector does not receive light in an expected manner.

2. The motor vehicle of claim 1, wherein the at least one optical waveguide is arranged between two plastic walls of the housing.

3. The motor vehicle of claim 1, wherein the at least one optical waveguide includes a glass fiber.

4. The motor vehicle of claim 1, wherein the at least one optical waveguide forms a grid across the bottom side of the housing.

5. The motor vehicle of claim 1, further comprising a cover closing the housing towards a topside of the motor vehicle, said cover comprising at least one of metal and electronic components.

6. The motor vehicle of claim 5, wherein the electronic components are used during the charging process.

7. A system, comprising:
    a housing having two walls made of plastic;
    an optical waveguide arranged between the two walls; and
    a coil received in the housing.

* * * * *